United States Patent [19]

Murray

[11] Patent Number: 4,988,836
[45] Date of Patent: Jan. 29, 1991

[54] DIGITIZER TABLET WITH INTEGRAL STORAGE

[75] Inventor: Wayne J. Murray, Bridgeport, Conn.

[73] Assignee: Summagraphics Corporation, Seymour, Conn.

[21] Appl. No.: 381,071

[22] Filed: Jul. 17, 1989

[51] Int. Cl.⁵ .......................................... G08C 21/00
[52] U.S. Cl. ...................................... 178/18; 178/87
[58] Field of Search ...................... 178/18, 19, 20, 87

[56] References Cited

U.S. PATENT DOCUMENTS 4,653,086  3/1987  Laube .............................. 178/19 X Primary Examiner—Stafford D. Schreyer
Attorney, Agent, or Firm—Rosen, Dainow & Jacobs

[57] ABSTRACT

A digitizer tablet providing secure storage therein for the cables, clips, stylus, and cursor is disclosed. A recess molded in the bottom surface of the tablet is partially covered by a plate so that a rectangular pocket is formed. Two channels are also molded in the bottom surface of the tablet so that the cables used to connect the tablet to a computer and to the stylus or cursor can be safely stored without disconnecting the cables from the tablet.

23 Claims, 2 Drawing Sheets

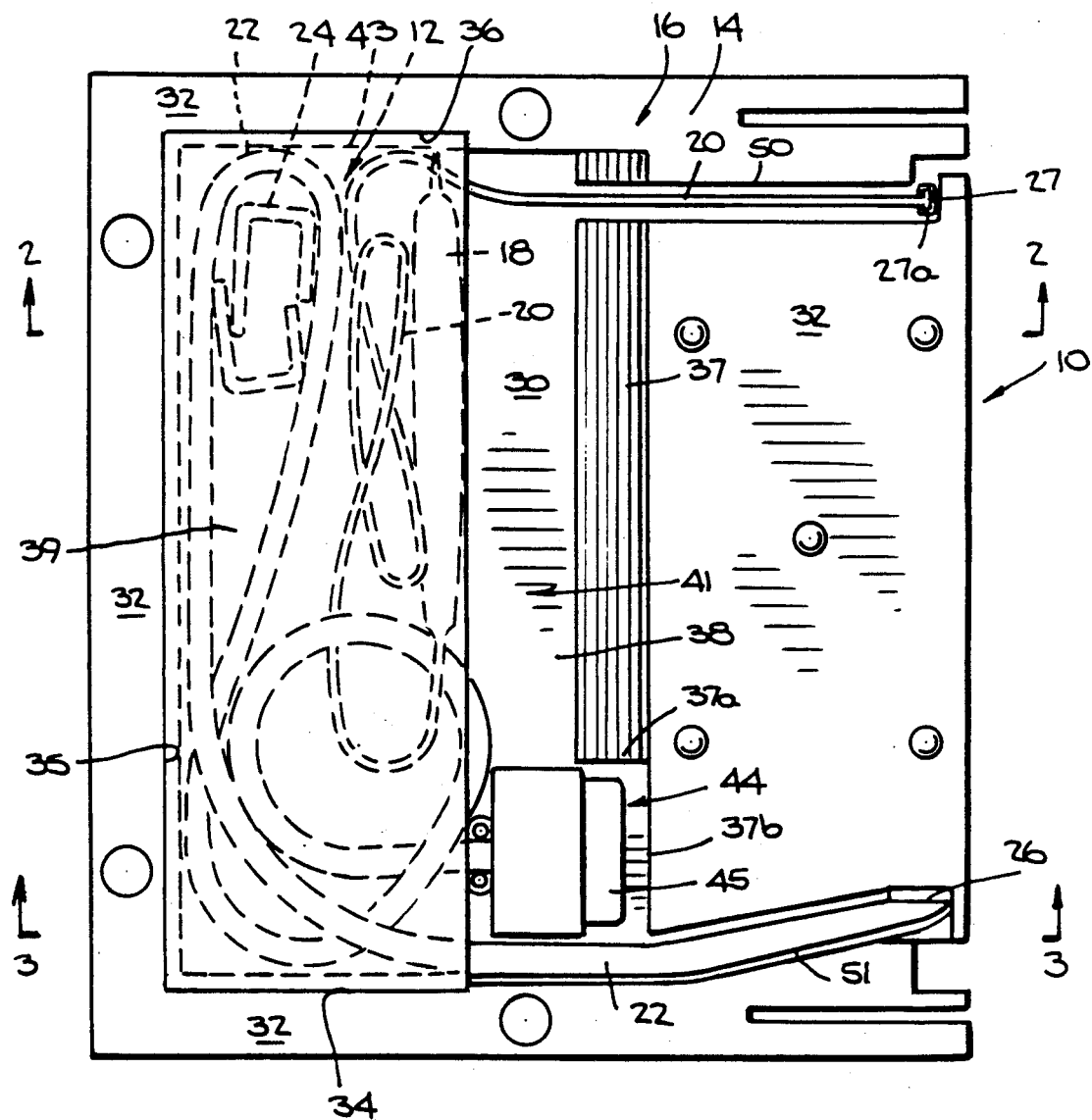

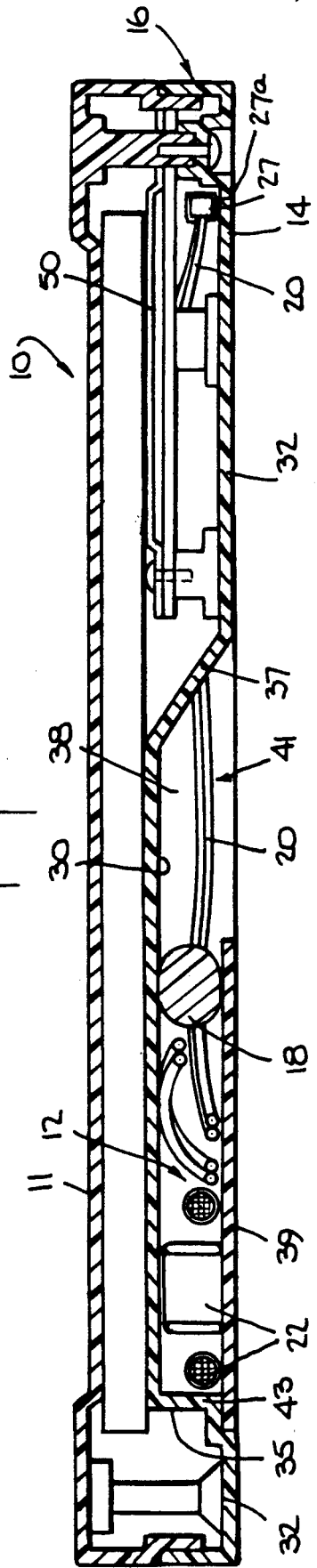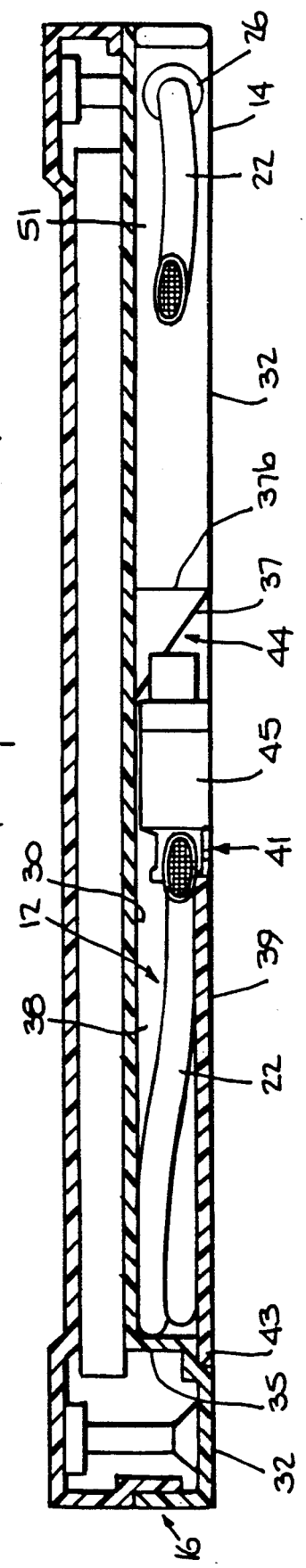

DIGITIZER TABLET WITH INTEGRAL STORAGE

BACKGROUND OF THE INVENTION

The present invention relates to digitizers. More particularly, the present invention relates to a digitizer tablet having means for conveniently carrying and storing digitizer components such as the cursor, stylus, clips and cables.

A digitizer includes a tablet and a cursor or stylus and provides digitized signals to a computer which represent the position of the cursor or stylus on a digitizing surface of the tablet. Typically, digitizers are used with a computer to input to the computer digitized signals representing graphics, drawings, etc., or menu selection, etc. The tablet includes a grid or electrode structure adjacent the digitizing surface which interacts with the cursor or stylus as it is moved on or in close proximity to the digitizing surface. The tablet typically encloses circuitry that generates the digitized signals representing the position of the cursor or stylus relative to the digitizing surface.

Typically, a heavier interface cable is used to connect the digitizer tablet to the computer and another lighter cable is used to connect the cursor or the stylus to the tablet. Frequently, spring clips are used to secure sheet material (e.g., graphics or a menu overlay) to the digitizing surface of the tablet.

One problem frequently encountered with digitizers when they are not in use is the need for safe and orderly storage of the various small components used with the digitizer tablet. The cursor, stylus, spring clips, and cables tend to be stored and carried separately from the tablet, for example, in envelopes or storage boxes. However, once thus separated from the tablet, those components are apt to become lost. Storage envelopes are not satisfactory for storing those components because they are not rigid, do not stack well and are inconvenient to store, and storage boxes are not satisfactory because they are too bulky, and take up too much space. On the other hand, when the components are left connected to an unused tablet, they tend to get in the way and present a disorderly appearance.

Thus, there is a need to provide safe and orderly storage for digitizer components of the type described above with the tablet without increasing substantially the size, cost and complexity of the tablet and without affecting substantially the streamlined appearance of the tablet or taking up any space on or adjacent the digitizing surface of the tablet.

SUMMARY OF THE INVENTION

An object of the present invention is to provide storage with a digitizer tablet for digitizer components used with the tablet such as the cables, stylus, cursor and clips.

Another object of the present invention is to provide for such storage with the tablet without substantially increasing the cost of the tablet.

Another object of the present invention is to provide for such storage with the tablet without substantially increasing the complexity of the manufacture of the tablet.

Another object of the present invention to provide for such storage with the tablet without substantially increasing the size of the tablet.

Another object of the present invention is to provide for such storage without substantially affecting the streamlined appearance of the tablet or occupying any space on or adjacent the digitizing surface of the tablet.

Another object of the present invention is to provide for such storage with the tablet without interfering with stable placement of the digitizer tablet on a flat surface.

Another object of the present invention is to provide compact digitizer apparatus that can be conveniently stored as a unit.

The present invention achieves these and other objects by providing a space associated with a digitizer tablet for storing digitizer components such as a stylus, cursor, cables and clips. The space may be defined by a recess, pocket, compartment, etc. in the digitizer tablet suitably structured to retain digitizer tablets of the type described.

The digitizer tablet includes a first side including a digitizing surface and a second side opposed to the first side. Preferably, the first and second sides of the digitizer tablet are parallel to each other. In accordance with a specific embodiment of the invention, the space is provided associated with the second side with access thereto provided in the second side of the tablet or in the periphery of the tablet. In a specific embodiment, the space is defined by a recess in the second side of the tablet and structure for retaining digitizer components of the type described therein.

In a preferred embodiment, the bottom of the tablet is provided with a recess therein and a cover for closing the recess except for an opening thereto, thereby providing an enclosure with an opening for access thereto for inserting and removing the digitizer components from the enclosure.

According to a preferred embodiment, the tablet includes a molded base having a bottom, and the space is defined by an enclosure in the nature of a compartment or pocket in the bottom with an opening thereto also in the bottom. In one embodiment, the bottom of the base is molded with a recessed bottom surface portion, an unrecessed bottom surface portion and one or more sidewalls extending between the recessed and unrecessed bottom surface portions. The enclosure is defined by the recessed bottom surface portion, the one or more sidewalls and a cover opposite the recessed bottom surface portion connected to the digitizer tablet base bottom so its outer surface is flush with the unrecessed bottom surface portion, thereby presenting a digitizer tablet base bottom which stably supports the tablet on a flat surface. The cover is sized to provide an opening to the enclosure form the bottom of the base.

Preferably, the cover is a plate and a lip is formed at the edge of the one or more sidewalls which receives the plate, and the plate is solvent bonded to the lip. Alternatively, the plate may be a unitary part of the base, e.g., the plate may be molded integrally with the rest of the base either in a single or in multiple molding operations, with or without the lip.

The dimensions of the enclosure and the opening that provides access to the enclosure are selected so that the stylus, cursor, cables and clips may be inserted into the enclosure and securely held therein. Preferably, the sidewall or sidewall portion of the recess adjacent the opening is sloped to form a ramp, and substantially the entire ramp is exposed by the opening. Preferably, the recess extends into a portion of the sloped sidewall to form rectangular well therein suitable for accommodating a cable connector.

The base may be provided with channels in the bottom thereof for running the cables from their point of entry into the tablet. The channels are structured to receive a respective cable therein so that it does not project from the bottom surface of the base. This provides a flat, rigid unit with a flush bottom that includes all the components of the digitizer and can be conveniently stacked for storage, or carried in a plastic or leather carrying case or envelope.

The structure provided in accordance with the present invention is inexpensive to manufacture and provides convenient, secure storage for digitizer components that are otherwise easily misplaced and awkward to carry. In addition the invention provides a digitizer that is more compact than digitizers in which the tablet is stored separately from the other components.

The above and other objects, aspects, features and advantages of the invention will be more readily perceived from the description of the preferred embodiments thereof taken in conjunction with the accompanying drawings and appended claims.

BRIEF DESCRIPTION OF THE DRAWINGS

The invention is illustrated by way of example and not limitation in the figures of the accompanying drawings in which like references denote the same or corresponding parts, and in which:

FIG. 1 is a bottom plan view of a digitizer tablet in accordance with the present invention;

FIG. 2 is a cross-sectional view of the tablet shown in FIG. 1 taken along line 2—2 thereof; and FIG. 3 is a cross-sectional view of the tablet shown in FIG. 1 taken along line 3—3 thereof.

DESCRIPTION OF THE PREFERRED EMBODIMENTS

Referring to the drawings, digitizer tablet 10 has a digitizing surface (FIGS. 2 and 3) and a storage enclosure or pocket 12 in the bottom 14 of base 16 in which are stored stylus 18, stylus cable 20, computer interface cable 22, and clips 24. Digitizer tablet 10 includes a grid or electrode structure, circuitry, shielding and other components which are not shown. Such components are generally known in the art, and an understanding of such components is not necessary for an understanding of the invention. Therefore, such components have not been shown or described. Interface cable 22 is permanently connected to tablet 10 through grommet 26 in base 16. Stylus cable 20 is removably or permanently connected to tablet 10. Pocket 12 may also house a cursor, not shown, in addition to or in lieu of stylus 18. The cursor may be removably or permanently connected to tablet 10. Perferably, stylus cable 20 and the cursor cable have a modular plug 27 and tablet 10 includes a mating receptacle 27a which interchangeably receives the modular plug 27 of the stylus or cursor.

Bottom 14 includes a recessed surface portion 30, an unrecessed surface portion 32 and sidewalls 34–37 connecting the recessed and unrecessed bottom surface potions 30, 32 to define a recess 38. A plate 39 is disposed opposite recessed surface portion 30, parallel thereto and spaced therefrom to form pocket 12. Plate 39 is sized and disposed to define an opening 41 to pocket 12 adjacent sidewall 37. Base 16 is molded with recessed bottom surface portion 30, unrecessed bottom surface 32 and sidewalls 34–37 integral with the remainder of the base.

A lip 43 formed in unrecessed bottom surface portion 34 at the edge of sidewalls 34–36 receives plate 39 which is bonded to lip 43 by any suitable means, e.g., by chemical or adhesive bonding, e.g., solvent bonding. Plate 39 lies flush with unrecessed bottom surface portion 32, as shown in FIG. 2.

Sidewall 37 is sloped to form a ramp that is oblique to recessed bottom surface portion 30 and is entirely exposed by opening 41. This facilitates insertion and removal of digitizer components into and from pocket 12. Sidewall 37 includes at one end thereof portions 37a and 37b which extend perpendicularly from unrecessed bottom surface portion 30 to form a well 42 into which recessed bottom surface portion 30 extends. Well 44 is provided so that connector 45 of computer interface cable 22 may conveniently be held therein flush with unrecessed bottom surface portion 32.

Cable 22 is held in pocket 12 wedged between plate 39, recessed bottom surface portion 30, sidewall 35 and well 44. Cable connector 45 is urged into and is engaged by well 44 due to the spring action of the cable.

Stylus 18 and stylus cable 20 are held in pocket 12 by wedging them between plate 39 and recesssed bottom surface portion 30. Clips 24 are inserted in pocket 12 so as to be held therein by cable 22, cable 20 or both.

Channels 50, 51 are formed in unrecessed bottom surface portion 32 for running cables 20 and 22 to grommets 26. Connection of cables 20 and 22 to connector receptable 27a and grommet 26 respectively and channels 50, 51 assist in holding cables 20, 22 in pocket 12.

Certain changes and modifications of the embodiments of the invention herein disclosed will be readily apparent to those of skill in the art. It is the applicant's intention to cover by the claims all such uses and all those changes and modifications which could be made to the embodiments of the invention herein chosen for the purposes of disclosure which do not depart from the spirit and scope of the invention.

What is claimed is:

1. A digitizer tablet comprising:
   a first side and an opposed second side, said first side including a digitizing surface; and
   means defining a space associated with said opposed side for storing digitizer components therein.

2. The digitizer tablet of claim 1 wherein.said means define an enclosure.

3. The digitizer tablet of claim 2 wherein said enclosure has an opening in said second side.

4. The digitizer tablet of claim 3 wherein said second side includes a recess therein and a cover therefore which define said enclosure and said opening.

5. A digitizer tablet having a first side including a digitizing surface and a second side opposed to said first side, said second side having a recessed bottom surface portion, an unrecessed bottom surface portion and one or more sidewalls extending between said recessed and unrecessed bottom surface portions, a cover secured to said second side spaced from and opposite said recessed bottom surface portion, said recessed bottom surface portion, said one or more sidewalls and said cover defining an enclosure, said cover being sized to provide an opening to said enclosure from said second side.

6. The digitizer tablet of claim 5 wherein said recessed bottom surface portion and said one or more sidewalls define a recess, and said cover is a plate secured to said second side to partially close said recess to form said enclosure.

7. The digitizer tablet of claim 6 wherein said plate is secured to said second side so its outer surface is flush with said unrecessed bottom surface portion, thereby presenting a second side which stably supports said tablet on a flat surface.

8. The digitizer tablet of claim 5 wherein said opening provided by said cover is adjacent and substantially exposes a sidewall or exposes a substantial sidewall portion.

9. The digitizer tablet of claim 6 wherein said sidewall or said sidewall portion of said recess exposed by said opening is sloped to form a ramp, and substantially the entire ramp is exposed by said opening.

10. The digitizer tablet of claim 9 including a rectangular well in said sloped sidewall or sidewall portion suitable for accommodating a cable connector.

11. The digitizer tablet of claim 5 comprising a channel in said second side for receiving a cable connected at an end of said channel to said tablet, said enclosure being suitable to store the portion of said cable not disposed in said channel.

12. A digitizer comprising a digitizer tablet and at least one digitizer component for use with said tablet, said tablet comprising:
a base having a recess in a bottom thereof, and means for partially closing said recess so as to form a pocket having an opening suitable for receiving and storing said component.

13. The digitizer tablet of claim 12 wherein said recess is defined by said sidewalls and said closing means is a plate, said plate being connected to edges of said sidewalls.

14. The digitizer tablet of claim 13 wherein said plate is parallel to and flush with an unrecessed portion of said bottom.

15. The digitizer tablet of claim 12 wherein said recess is defined in part by sidewalls, and a side wall adjacent said opening is sloped to form a ramp adapted to facilitate the insertion and removal of a digitizer component.

16. The digitizer tablet of claim 15 wherein said sloped sidewall includes a well for receiving at least a portion of a component.

17. The digitizer tablet of claim 16 wherein said digitizer includes an interface cable having a connector, and said well partially receives said connector.

18. A digitizer comprising a digitizer tablet and at least one digitizer component such as a clip, an interface cable, a stylus and a cursor,
said tablet having a recess in a bottom surface thereof, said recess being defined in part by sidewalls, said tablet comprising:
a plate partially covering said recess so as to form a pocket having an opening adjacent and exposing one sidewall wall of said recess; and
a lip extending about a periphery of said recess for receiving said plate so that said plate is flush with an unrecessed portion of said surface.

19. The digitizer of claim 18 wherein said plate is attached to said lip by a chemical or adhesive bond.

20. The digitizer of claim 18 comprising a channel in said bottom surface for receiving a cable connected at an end of said channel to said tablet, said pocket being suitable to store the portion of said cable not disposed in said channel.

21. The digitizer of claim 18 wherein a side wall adjacent and exposed by said opening is sloped to form a ramp adapted to facilitate the insertion and removal of a digitizer component.

22. The digitizer tablet of claim 21 wherein said sloped sidewall includes a well for receiving at least a portion of a component.

23. The digitizer tablet of claim 22 wherein said digitizer includes an interface cable having a connector, and said well partially receives said connector.

* * * * *